(12) United States Patent
Brune

(10) Patent No.: US 9,664,806 B2
(45) Date of Patent: *May 30, 2017

(54) METHOD TO IMPROVE SPATIAL SAMPLING OF VERTICAL MOTION OF SEISMIC WAVEFIELDS ON THE WATER BOTTOM BY UTILIZING HORIZONTAL ROTATIONAL MOTION AND VERTICAL MOTION SENSORS

(75) Inventor: Robert H. Brune, Evergreen, CO (US)

(73) Assignee: Geokinetics Acquisition Company, Houston, TX (US)

( * ) Notice: Subject to any disclaimer, the term of this patent is extended or adjusted under 35 U.S.C. 154(b) by 677 days.

This patent is subject to a terminal disclaimer.

(21) Appl. No.: 13/279,352

(22) Filed: Oct. 24, 2011

(65) Prior Publication Data

US 2012/0113748 A1 May 10, 2012

Related U.S. Application Data

(63) Continuation-in-part of application No. PCT/US2011/051653, filed on Sep. 14, 2011.

(60) Provisional application No. 61/390,938, filed on Oct. 7, 2010, provisional application No. 61/382,789, filed on Sep. 14, 2010.

(51) Int. Cl.
*G01V 1/24* (2006.01)
*G01V 1/28* (2006.01)

(52) U.S. Cl.
CPC . *G01V 1/24* (2013.01); *G01V 1/28* (2013.01)

(58) Field of Classification Search
CPC .................................. G01V 1/24; G01V 1/28
USPC ............................................. 367/15, 38, 178
See application file for complete search history.

(56) References Cited

U.S. PATENT DOCUMENTS

| 2,657,373 | A | * | 10/1953 | Piety | 367/58 |
| 7,474,591 | B2 | * | 1/2009 | Menard et al. | 367/178 |
| 2006/0245300 | A1 | * | 11/2006 | De Kok et al. | 367/15 |
| 2010/0195439 | A1 | * | 8/2010 | Muyzert | 367/56 |
| 2013/0211727 | A1 | * | 8/2013 | Brune | 702/14 |

OTHER PUBLICATIONS

Lee et al, "Measuring rotational ground motions in seismological practice" Feb. 2011; DOI: 10.2312/GFZ.NMSOP-2_IS_5.3.*

* cited by examiner

*Primary Examiner* — Ian J Lobo
(74) *Attorney, Agent, or Firm* — Karen B. Tripp

(57) ABSTRACT

A method for spatial sampling of a seismic wavefield at the bottom of a water layer at an effective spatial sampling denser than the physical layout of the sensors. The sensors comprise a sensing element for vertical particle motion and a sensing element for rotational motion around a horizontal axis. Stress and wavefield conditions allow the rotational sensing element to yield the transverse horizontal gradient of the vertical particle motion wavefield, used in ordinate and slope sampling to yield improved transverse spatial sampling of the vertical particle motion wavefield.

8 Claims, 2 Drawing Sheets

METHOD TO IMPROVE SPATIAL SAMPLING OF VERTICAL MOTION OF SEISMIC WAVEFIELDS ON THE WATER BOTTOM BY UTILIZING HORIZONTAL ROTATIONAL MOTION AND VERTICAL MOTION SENSORS

RELATED APPLICATIONS

This application is a continuation in part of PCT/US2011/051653, filed 14 Sep. 2011, pending, which claims priority from U.S. Provisional Patent Application Ser. No. 61/390,938, filed Oct. 7, 2010, and U.S. Provisional Patent Application Ser. No. 61/382,789, filed Sep. 14, 2010.

BACKGROUND OF THE INVENTION

1. Field of the Invention

The present invention pertains to the art of seismic surveying for the exploration and production of petroleum reservoirs, and more specifically to the joint use of linear and rotational sensors on the bottom of a water layer overlying the solid earth to enhance the spatial sampling of seismic wavefields.

2. Description of Relevant Art

There is a long term trend in seismic reflection surveying for oil and gas exploration and production to utilize sensing elements, commonly known as geophones, at decreasing spatial sample intervals. There is a continuing need for economical ability to measure seismic wavefields at finer spatial sampling. The need for economical and efficient acquisition of seismic data is particularly significant for surveys acquired on the water bottom. There are particular modes of seismic noise and interfering signals on the water bottom that are better ameliorated with finer spatial sampling of the seismic wavefields.

It is well understood in many fields of physical science and engineering that a complete representation of mechanical motion requires the measurement of six degrees-of-freedom. Typically this is accomplished by measuring three orthogonal linear motions, and measuring rotations around three orthogonal axes.

There is a well established technology for measurement of the linear particle motion of seismic wavefields in the earth. Many commercial sensors exist to measure particle velocity or particle acceleration along one, or up to three, linear axes, utilizing various physical concepts to accomplish the measurements. It is most common to utilize measurements of the vertical particle motion. On the water bottom linear particle motion sensors are commonly deployed, typically along with pressure sensing hydrophones, in Ocean Bottom Cables or in Ocean Bottom Nodes.

There is an evolving commercial technology for measurement of the rotational particle motion of seismic wavefields in the earth. This includes sensors such as those commercially offered by, for example, MetTech (model Metr-3) Jun. 2010, http://www.mettechnology.com, and Eentec (models R-1 and R-2) Jun. 2010, http://www.eentec.com/R-1_data_new.htm.

The utility of rotational seismic measurements is appreciated in earthquake and regional crustal seismology, as discussed, for example, in Lee, W., et. al., eds., 2009, Rotational Seismology and Engineering Applications, Bull. Seismological Society of America, vol. 99, no. 2B, supplement, May, 2009. Seismic rotational motion is commonly understood to be the vector curl of the infinitesimal displacement field. The existing rotational sensors are understood to measure the components of this vector curl.

The significant effect of the water bottom on stress fields, strain fields, and seismic wave fields is widely understood. These concepts are described, for example, in Aki, K., and Richards, P., 2002, *Quantitative Seismology*, University Science Books, p. 128 ff., pp. 184-185. The shear modulus of water is commonly understood to be effectively zero for seismic wave propagation. The shear stress components commonly referred to as $\sigma_{xz}$ and $\sigma_{yz}$, involving the nominal vertical direction z, normal to the water bottom for a nominally horizontal water bottom, have zero value at the water bottom.

In the field of sampled data analysis, there is a well established technology for enhanced sampling rate by utilizing the sampling of the ordinate values and the slope of the function being sampled. This technology is commonly understood for time series data, and is also directly applicable to spatial sampling. This technology, often referred to as Ordinate and Slope Sampling, is described, for example, in Bracewell, R., 2000, *The Fourier Transform and its Applications*, McGraw-Hill, pp. 230-232.

SUMMARY OF THE INVENTION

The object of the present invention is to improve horizontal spatial sampling of a seismic wavefield at the water bottom without the need to occupy more locations for sensing elements by using a novel combination of the more complete description of particle motion offered by rotational motion sensors used with linear motion sensors The invention includes, in its many aspects and embodiments, a method to enhance the spatial sampling of seismic data recorded on the water bottom under a water layer overlying the solid earth by utilizing vertical particle motion and rotational motion around horizontal axes. More particularly, the method comprises: recording the vertical particle motion; recording the rotational motion around a horizontal axis orthogonal to the spatial horizontal direction for which enhanced spatial sampling is desired; utilizing this rotational motion as representative of the horizontal spatial gradient of the vertical motion; and utilizing this horizontal spatial gradient of the vertical particle motion, along with the vertical particle motion in an Ordinate and Slope signal reconstruction algorithm.

DETAILED DESCRIPTION OF THE INVENTION

Figure 1:
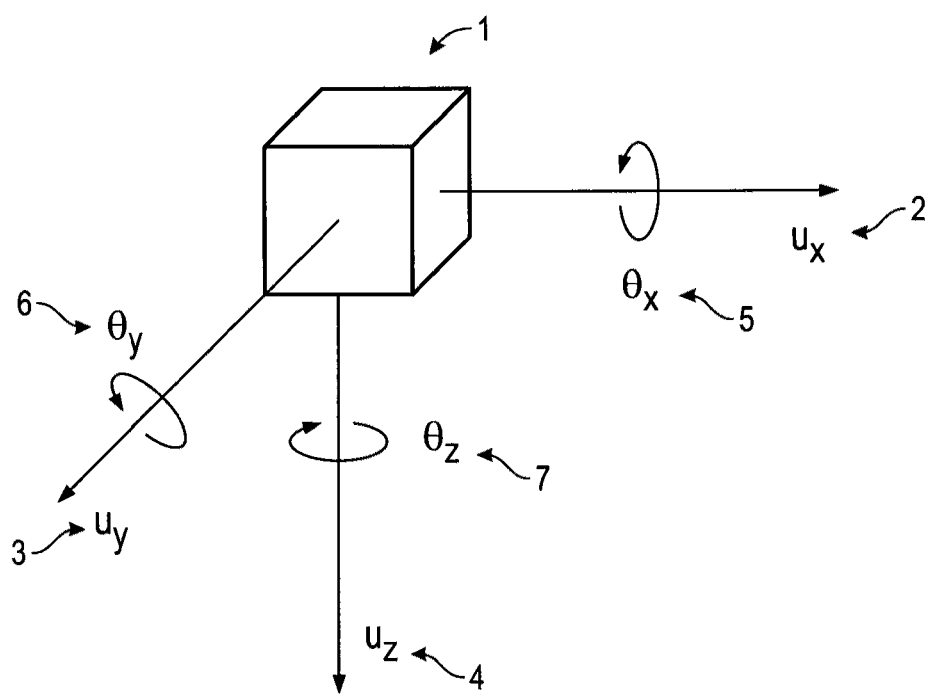
FIG. 1 is a diagrammatic view of the linear motion and rotational motion of a representative elemental volume of the earth.

The particle motion of a representative elemental volume 1 of the earth is as depicted in FIG. 1. A Cartesian coordinate system is utilized, but those skilled in the art will recognize that various alternate equivalent coordinate systems and representations of particle motion may be utilized, including the ability to handle the case of a sloping water bottom. The complete particle motion is comprised of three linear motions, 2-4, and three rotational motions, 5-7. A right-hand rule for axes and rotation sign conventions is used throughout for the present invention.

Rotational seismic data measured by rotational seismic motion sensors is typically defined as ½ of the vector curl of the displacement wavefield, u. Alternatively, in current commercially available rotational sensors, measurements may be made of the time derivative of this rotational displacement which is known as the angular rate, or angular velocity; or of the second time derivative of this rotational displacement which is known as the angular acceleration. It will be understood by those skilled in the art that the use of various time derivatives does not affect the present invention so long as the same time derivative is consistently utilized for both the linear and rotational motion measurements.

In the description of the present invention, without loss of generality, we shall consider that spatial sampling is to be enhanced in the x horizontal coordinate direction. From the mathematical definition of vector curl, we know that in Cartesian coordinates the y component of the rotational seismic motion is given as:

$$\theta_y \equiv \frac{1}{2}\left(\frac{\partial u_x}{\partial z} - \frac{\partial u_z}{\partial x}\right) \tag{1}$$

where $\theta_y$ is the rotational motion around the y axis, and $u_x$, $u_z$ are the x and z Cartesian components of the infinitesimal vector displacement field. The operators $$\frac{\partial}{\partial z} \text{ and } \frac{\partial}{\partial x}$$

are the partial derivatives in the spatial directions z and x, which will be recognized as spatial gradients. This equation defines that rotational seismic data is comprised of particular combinations of certain spatial gradients of components of the infinitesimal vector displacement field.

Figure 2:
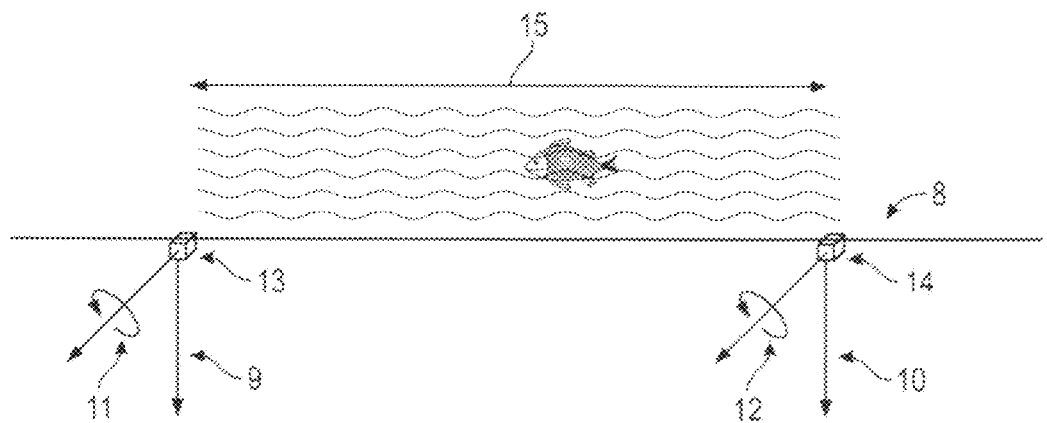
FIG. 2 is a diagrammatic view of the configuration of linear motion and rotational motion sensors on the water bottom under a layer of water overlying the solid earth such as to enable the ordinate and slope sampling method of the present invention.

FIG. 2 is a vertical cross-section, along a horizontal x axis, through a water layer overlying the solid earth. It diagrammatically depicts measurements on the water bottom 8. Linear vertical motion $u_z$ 9-10 and rotational motion $\theta_y$ 11-12 around the y horizontal axis, said y axis pointing out of the plane of the cross-section, are measured at two locations 13-14 which are separated along the horizontal x-axis by a distance $\Delta x$ 15 which is in the spatial horizontal direction for which enhanced spatial sampling is desired.

Those skilled in the art will recognize, for a nominally homogeneous and isotropic earth, that two shear components of the stress tensor in Cartesian coordinates have zero values at the water bottom.

$$\sigma_{xz}=\sigma_{yz}=0 \tag{2}$$

However, because of the gravitational loading of the water layer, the $\sigma_{zz}$ stress component is non-zero at the water bottom, unlike at the free surface:

$$\sigma_{zz} \neq 0$$

There is continuity of stress across the water bottom. In a linear elastic homogeneous isotropic earth, components of the stress and strain tensors are related by linear equations. In particular, at the water bottom:

$$\sigma_{xz}{}^{water}=\sigma_{xz}{}^{earth}=2(\mu^{earth})e_{xz} \tag{3}$$

where $\mu^{earth}$ is the non-zero shear modulus of the solid earth at the water bottom, and $e_{xz}$ is a component of the infinitesimal strain tensor in Cartesian coordinates, which is defined as $$e_{xz} \equiv \frac{1}{2}\left(\frac{\partial u_x}{\partial z}+\frac{\partial u_z}{\partial x}\right) \tag{4}$$

On the water bottom, using $$\sigma_{xz}=0$$

from equation (2) substituted into equation (3), the strain component defined in equation (4) has a zero value on the water bottom.

$$e_{xz} \equiv \frac{1}{2}\left(\frac{\partial u_x}{\partial z}+\frac{\partial u_z}{\partial x}\right)=0$$

This equation is equivalent to:

$$\frac{\partial u_x}{\partial z} = -\frac{\partial u_z}{\partial x} \tag{5}$$

This is a relationship between spatial gradients of components of the infinitesimal vector displacement field which is applicable at the water bottom.

By utilizing the relationship of equation (5) in the definition of the y component of rotational motion as given in equation (1), it is seen that:

$$\theta_y = \left(-\frac{\partial u_z}{\partial x}\right)$$

Thus the negative of the measured value of the y component of rotational motion, $\theta_y$, is equivalent to the horizontal spatial gradient, or slope, in the x direction for the vertical particle motion, $u_z$.

Figure 3:
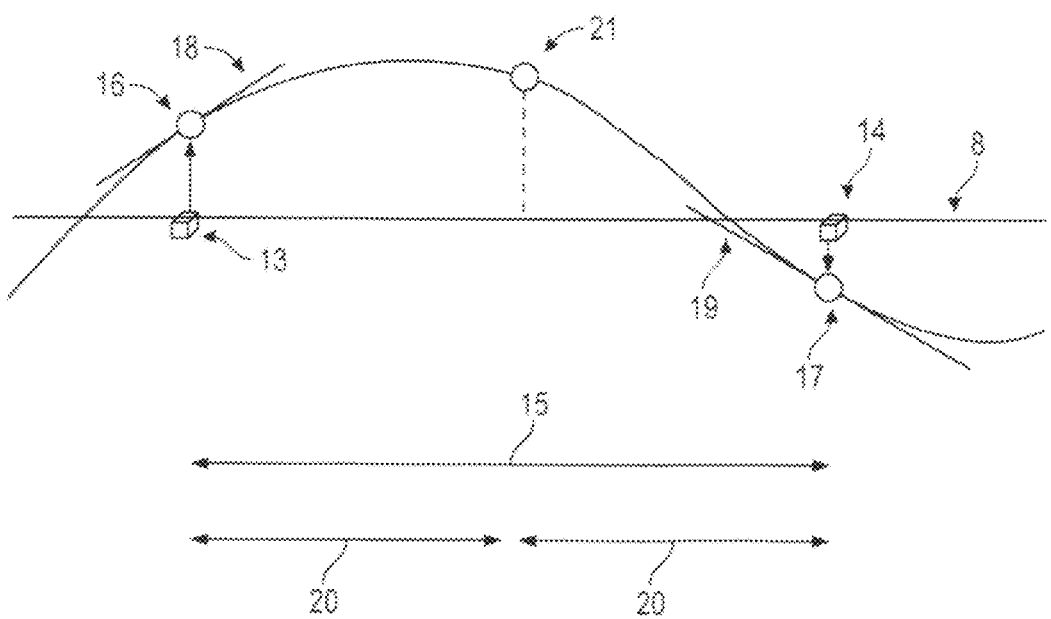
FIG. 3 is a diagrammatic representation of the ordinate and slope signal reconstruction aspect of the present invention.

FIG. 3 diagrammatically shows the reconstruction of the seismic wavefield utilizing the Ordinate and Slope sampling and data reconstruction technique. The figure shows two locations 13-14, along the horizontal x axis, at which we have Ordinate and Slope samples, which are respectively the vertical particle motions, $u_z$ 16-17 and the slopes, $$\frac{\partial u_z}{\partial x} \text{ 18-19.}$$

As will be recognized by those skilled in the art, the reconstruction of a wavefield in the x direction by Ordinate and Slope Sampling is done by means of sinc²(x) reconstruction functions for the ordinate, and x*sinc²(x) reconstruction functions for the slope, with the appropriate scaling for the particular spatial sample interval used. This technique is described, for example, in Bracewell, R., 2000, *The Fourier Transform and its Applications*, McGraw-Hill, pp. 230-232.

By utilizing the technique of the present invention, it will be recognized that for data recorded with a spatial sampling of $\Delta x$, the effective spatial sampling is ($\Delta x/2$) 20 in FIG. 3, which is seen to be at twice the spatial sampling rate of the physical recording locations on the water bottom. The method of the present invention is seen to be equivalent to having an additional sample of the vertical particle motion, $u_z$, at the intermediate location 21 at a spatial sampling interval of $(\Delta x/2)$ 20. It will be recognized that this effectively doubles the spatial Nyquist aliasing frequency for sampling in the x horizontal direction.

Those skilled in the art will recognize that the method of the present invention can be applied in both horizontal directions to improve the spatial sampling of the vertical component of particle motion in two horizontal dimensions.

In a preferred embodiment, consider a 3D seismic survey utilizing multiple parallel Ocean Bottom Cable receiver lines parallel to each other, and with, say, 400 meters crossline spacing between said receiver lines. Then for each field data record the present invention will yield an effective spatial sampling of 200 meters in the crossline direction for the vertical component of particle motion.

In another embodiment, consider a 3D seismic survey utilizing a grid of Ocean Bottom Nodes with spacings of, say, 400 meters in both x and y orthogonal horizontal directions. Then for each field data record the present invention will yield an effective spatial sampling of 200 meters in both the x and y horizontal directions for the vertical component of particle motion.

In another embodiment, consider a 2D or 3D survey with inline spacing between sensor locations in an Ocean Bottom Cable on the water bottom of, say, 50 meters. Then for each field data record the present invention will yield an effective spatial sampling of 25 meters in the inline horizontal direction for the vertical component of particle motion.

The foregoing description of the invention is intended to be a description of preferred embodiments. Various changes in the details of the described method can be made without departing from the intended scope of this invention as defined by the appended claims.

What is claimed is:

1. A method for seismic surveying for a petroleum reservoir employing joint use of linear and rotational sensors on the bottom of a water layer overlying solid earth, comprising:
   (a.) positioning sensors for measuring the vertical motion component of seismic data on the water bottom;
   (b.) measuring the vertical motion component of seismic data on the water bottom in a first horizontal direction;
   (c.) measuring the rotational motion on the water bottom around a second horizontal axis orthogonal to the first horizontal direction;
   (d.) computing the gradient of vertical motion in the first horizontal direction by utilizing the measured rotational motion around said second horizontal axis and the relationships of spatial derivatives of displacement components at the water bottom;
   (e.) reconstructing the horizontal sampling of the seismic wave field in the first horizontal direction, by means of the Ordinate and Slope sampling technique, such that the horizontal spatial sampling of the seismic wave field at the water bottom is enhanced or improved without positioning additional sensors on the water bottom;
   (f.) collecting or obtaining at least one field data record wherein the effective spatial sampling spacing is half the physical spacing of the sensors in the first horizontal direction.

2. The method of claim 1 wherein the sensors are ocean bottom nodes with spacing in a grid for a three dimensional seismic survey of about 400 meters in both x and y orthogonal horizontal directions and the field data record yields an effective spatial sampling of about 200 meters in both first and second horizontal directions for the vertical particle motion.

3. The method of claim 1 for a two dimensional seismic survey having inline spacing between sensor locations in an ocean bottom cable on the water bottom of about 50 meters wherein the field data record yields an effective spatial sampling of about 25 meters in the inline horizontal direction for the vertical component of particle motion.

4. The method of claim 1 for a three dimensional seismic survey having inline spacing between sensor locations in an ocean bottom cable on the water bottom of about 50 meters wherein the field data record yields an effective spatial sampling of about 25 meters in the inline horizontal direction for the vertical component of particle motion.

5. A method for recording seismic data with enhanced spatial sampling of vertical motion of seismic wave fields on the water bottom, the method comprising:

positioning sensors for recording and recording the vertical particle motion;

recording the rotational motion around a horizontal axis orthogonal to the spatial horizontal direction for the enhanced spatial sampling;

using the rotational motion as representative of the horizontal spatial gradient of the vertical motion;

using the horizontal spatial gradient of the vertical particle motion with the vertical particle motion in the Ordinate and Slope sampling technique, reconstructing the horizontal sampling of the seismic wave field in the first horizontal direction, whereby the effective sampling of seismic data recording is at a spatial sample spacing of half the physical spacing of the sensors in the first horizontal direction, such that the horizontal spatial sampling of the seismic wave field at the water bottom is enhanced or improved without positioning additional sensors on the water bottom; and collecting or obtaining at least one field data record.

6. The method of claim 5 wherein the sensors are ocean bottom nodes with spacing in a grid for a three dimensional seismic survey of about 400 meters in both x and y orthogonal horizontal directions and the field data record yields an effective spatial sampling of about 200 meters in both first and second horizontal directions for the vertical particle motion.

7. The method of claim 5 for a two dimensional seismic survey having inline spacing between sensor locations in an ocean bottom cable on the water bottom of about 50 meters wherein the field data record yields an effective spatial sampling of about 25 meters in the inline horizontal direction for the vertical component of particle motion.

8. The method of claim 5 for a three dimensional seismic survey having inline spacing between sensor locations in an ocean bottom cable on the water bottom of about 50 meters wherein the field data record yields an effective spatial sampling of about 25 meters in the inline horizontal direction for the vertical component of particle motion.

* * * * *